Patented June 8, 1943

2,321,127

UNITED STATES PATENT OFFICE 2,321,127

PROCESS FOR PREPARING COATING COMPOSITIONS

Albert T. Camp, Belvidere, N. J., assignor to Hercules Powder Company, Wilmington, Del., a corporation of Delaware No Drawing. Application September 3, 1942, Serial No. 457,191

6 Claims. (Cl. 106—227)

This invention relates to a method for the production of varnishes, and more particularly to a method for the production of improved limed rosin varnishes.

It is well known to prepare limed rosin varnishes by cooking a mixture of limed rosin and a drying oil at 540–585° F. for a period of time sufficient to produce a varnish base of the desired viscosity, and then adding a suitable solvent. Limed rosin varnishes prepared from tung oil according to such procedures are pale in color, have high gloss, and are durable and rapid drying. However, when these varnishes are prepared from ordinary soft oil, such as linseed oil, the product has lacked the desirable property of rapid drying, and consequently has not been useful for such purposes as a vehicle for traffic paints, shellcase paints, etc., which of necessity must dry quickly.

Now, in accordance with this invention, an improved method for the production of soft oil-limed rosin varnishes having an oil length within the range from about 5 to about 100 gallons and a combined calcium content within the range from about 1 to about 5% has been discovered. This method comprises subjecting from about 25 to about 80% of the total soft oil which is to be contained in the finished varnish composition to a heat treatment at a temperature within the range from about 565 to about 620° F. until the mixture starts to gel. This step may be accomplished by heating the soft oil alone, or with the soft oil in contact with up to about 25% of the rosin which is to be contained in the finished varnish. The gel is then dispersed by adding the remainder of the rosin which is to be contained in the finished varnish composition, this rosin being added either as such or limed with up to about 5% of calcium. Depending upon the amount of calcium desired in the final varnish composition and upon the amount of calcium introduced into the composition by the addition of limed rosin, sufficient calcium compound may then be introduced into the mixture at a temperature within the range from about 350 to about 550° F. to give a calcium content within the range from about 1 to about 5%, based upon the total weight of rosin in the finished varnish. The varnish base is completed by adding sufficient soft oil to yield a mixture having an oil length within the range from about 5 to about 100 gallons, and heating the mixture at a temperature within the range from about 500 to about 620° F. until the mixture has attained the desired viscosity. This varnish may thereafter be cooled and thinned with a suitable varnish solvent. Driers may be added as the oxides or salts of iron, cobalt, manganese, lead, etc., during the cooking operation, or added as oil-soluble derivatives after the varnish has been reduced. Thus, by employing the method of this invention, there is produced in decreased cooking time a soft oil-limed rosin varnish having greatly increased drying rate, and displaying in its applied films improved through hardness, and other desirable properties.

Having thus indicated in a general way the nature of this invention, the following examples are offered to illustrate the improved method for the production of limed rosin varnishes from soft oils. In the specification and in the claims, the parts and percentages are by weight unless otherwise indicated.

Example 1

One hundred sixty parts of Z2 bodied dehydrated castor oil, 80 parts of Z3 heat-bodied linseed oil and 30 parts of N wood rosin were heated to 585° F. in about 30 minutes and held at that temperature for about 1 hour until the oils started to gel as evidenced by string forming from the stirrer when lifted from the mixture. One hundred seventy parts of limed N wood rosin containing 3.5% of calcium and prepared as described below were then added to the charge with stirring. The temperature was raised to 450° F., at which point 2 parts of lime flour were worked into the mixture. Thereafter, the batch was heated to 525° F. and held there for 15 minutes. Eighty more parts of Z3 heat-bodied linseed oil and 80 parts of fish oil dimer (extracted by solvent procedure) were added and the batch heated to 575° F., at which point it was held for 2 hours until a soft pill was formed. The mixture was then reduced with mineral spirits to one containing 50% solids. The resulting varnish composition had a Gardner-Holdt viscosity of K and a color of 4 Hellige. Naphthenate driers were then added to produce a varnish containing 0.07% cobalt and 0.2% lead, based on the oil content. This varnish set dust free in 2¾ hours and dried in 4¾ hours. Varnishes of similar composition made by prior art procedures required a considerably longer period for drying.

The limed rosin was prepared by heating 1000 parts of N wood rosin to 450° F. and then gradually sifting in with stirring 70 parts of lime flour. Towards the end of the liming operation, 1 part of calcium acetate was added slowly in order to insure reaction of the last portions of lime. The batch was then heated to 525 F. and held at that temperature for 30 minutes, after which the limed rosin was poured into cooling pans and stored for subsequent use.

*Example 2*

Eighty parts of Z2 bodied dehydrated castor oil, 80 parts of Z3 heat-bodied linseed oil and 20 parts of N wood rosin were heated to 585° F. in about 30 minutes and held at that temperature for about 40 minutes until the oil began to gel. One hundred eighty parts of N wood rosin were then added, the mixture heated to 450° F. and 14 parts of lime flour added slowly. In order to insure complete reaction of the lime, 0.2 part of calcium acetate was added toward the end of the liming operation. The mixture was then heated to 525° F. and held there for 15 minutes. After this, 80 parts of Z3 heat-bodied linseed oil and 80 parts of fish oil dimer were added, the mixture heated to 565° F., and held there until a cold drop could be rolled into a medium pill. The mixture was cooled to 400° F. and reduced with V. M. & P. naphtha to a solution containing 50% solids. Driers were added to this varnish as in Example 1. The varnish dried free to dust in 2 hours and was tack free in 3½ hours. The composition has a Gardner-Holdt viscosity of F+ and a color of 4 Hellige.

*Example 3*

Two hundred forty parts of Z2 bodied dehydrated castor oil and 30 parts of N wood rosin were heated to 585° F. in about 30 minutes and held at this temperature for 25 minutes until the oil had begun to gel. One hundred seventy parts of N wood rosin were then added and the batch heated to 450° F. Ten parts of lime flour were added slowly over a 30-minute period at this temperature, 0.2 part of calcium acetate being added toward the end of the reaction. The batch was then heated to 525° F. and held there for 15 minutes. After this, 320 parts of Z3 heat-bodied linseed oil were added, the batch heated to 450° F. and 6 parts of litharge worked in at this temperature. The batch was heated to 585° F. and held at that temperature for 2¾ hours until a soft pill was obtained. The mixture was then cooled and reduced with mineral spirits to 50% solids. The varnish had a Gardner-Holdt viscosity of M and a color of 6L Hellige. After adding 0.07% cobalt metal drier, based on the weight of the oil, the composition set to dust in 4 hours and dried to aluminum foil in 7 hours and 15 minutes.

The above examples illustrate the improved method of this invention for preparing soft oil-limed rosin varnish bases by heating a soft oil until it starts to gel, adding rosin or limed rosin to disperse the gel, then adding a further quantity of soft oil and cooking the mixture to the desired viscosity. This mixture may then be cooled and a solvent added to produce a composition of the required viscosity, and suitable driers and pigments may also be added.

As is shown in the examples, the limed rosin varnishes may be prepared using any soft oil, such as dehydrated castor oil, heat-bodied linseed oil, fish oil, etc. In the examples, 50-60% of the soft oil, based upon the total weight of the soft oil in the finished varnish composition, was subjected to the initial gelation procedure. In general, however, from about 25 to about 80% of the total amount of soft oil desired in the final varnish may be initially gelled. The examples show that the initial gelation may be conducted at 585° F. but any temperature between about 565 and about 620° F. may be employed.

The gelation step may be accomplished with the soft oil in contact or not in contact with any rosin. In the examples, the soft oil was gelled in contact with 10-15% of N wood rosin, based upon the total weight of the rosin in the finished varnish composition, but in general the soft oil may be gelled in contact with from 0 to about 25% of any rosin, based upon the total weight of the rosin in the final varnish mixture. In the examples, the gel was dispersed by means of N wood rosin, but in its place there may be employed any wood or gum rosin, or the pure rosin acids contained therein such as abietic acid, pimaric acid, etc. Modified forms of any of these rosins or pure rosin acids may be employed, such as hydrogenated rosin; rosin which has been heat treated at 250-325° C. for a period of time sufficient to produce substantial isomerization of the rosin; rosins which have been disproportionated by means of hydrogenation catalysts as platinum, palladium, etc.; polymerized rosins which have been polymerized, usually while dissolved in a suitable inert organic solvent, by means of any of the known polymerization catalysts as sulfuric acid, boron trifluoride, aluminum chloride, etc., to produce a substantial increase in the drop melting point of the rosin, etc.

The examples illustrate that the gel may be dispersed with the aid of N wood rosin or limed N wood rosin. In the examples, the gel was dispersed employing 85-90% of rosin, based upon the total weight of rosin in the finished varnish composition, but any amount of rosin or limed rosin within the range from about 75 to 100%, based upon the total weight of rosin in the finished varnish mixture, may be used to disperse the gel. The gel may be dispersed with the aid of any of the rosins, rosin acids, and/or modified rosins disclosed in the previous paragraph, or with the aid of any of these rosins which have been limed so as to have a calcium content as high as 5% by weight. In the examples, the gel was dispersed at 450° F., but those skilled in the art will realize that other suitable temperatures may be employed.

After the gel has been dispersed by the addition of rosin or limed rosin, the varnish base may be further limed by the addition of lime flour, as shown in Example 2, or by the addition of calcium acetate, calcium oxide, or other suitable calcium compound to yield a composition having a calcium content within the range from about 1 to about 5%, and preferably from about 1½ to about 4%, based upon the total weight of rosin in the finished varnish. Whether or not this liming operation is employed will depend upon the amount of calcium introduced into the composition in the form of limed rosin and upon the amount of calcium desired in the finished composition. When the varnish base is limed by the addition of calcium oxide, hydrated lime, or other suitable compound according to the procedure shown in Examples 2 and 3, the liming is preferably aided by the addition of a small amount of calcium acetate or similar calcium salt of a weak acid, according to procedures which are well known in the art. In Examples 2 and 3, the varnish base was limed at 450° F., but in general this operation may be conducted at any temperature within the range from about 350 to about 550° F.

After the incorporation of the required amount of calcium into the varnish base, the remaining soft oil is added to yield a varnish having an oil length within the range from about 5 to about 100 gallons (gallons of oil per 100 pounds of resin), and preferably from about 10 to about 60 gallons. In the examples, the varnish base was cooked at 585° F. to give it the proper body, but in general the varnish may be bodied at any temperature within the range from about 500 to about 620° F., and preferably from about 540 to about 585° F. After the varnish base has been prepared, it may be cooled somewhat and thinned with a suitable solvent. In the examples, the varnish base was thinned with mineral spirits and V. M. & P. naphtha, but instead there may be used turpentine; paraffin hydrocarbons as hexane, heptane, etc.; aromatic hydrocarbons as benzene, toluene, xylene, etc.; tetrahydronaphthalene; decahydronaphthalene; Solvesso Nos. 1, 2, 3, 4, etc. In general, the finished varnish composition may contain from about 20 to about 80% total solids. If desired, cobalt, zinc, manganese, etc. driers may be cooked into the varnish composition or may be added as soluble driers to the finished varnish, in accordance with procedures well known in the art. The varnishes may be also pigmented with the aid of pigments such as titanium dioxide, basic lead carbonate, zinc oxide, lithopone, etc., to form enamels.

The method described in this specification represents an improved method for the preparation of limed rosin varnishes from soft oils. By employing this method, there is produced in a shorter cooking time a more rapid drying varnish, thus making these compositions suitable for use as traffic paints, shellcase paints, etc., for which use the limed rosin-soft oil varnishes of the prior art were not suitable.

What I claim and desire to protect by Letters Patent is:

1. The process for preparing a soft oil-limed rosin varnish having an oil length within the range from about 5 to about 100 gallons of oil per 100 pounds of rosin and a combined calcium content within the range from about 1 to about 5% by weight of the total rosin in the varnish which comprises heating from about 25 to about 80% of the total soft oil contained in the finished varnish composition in contact with up to about 25% of the rosin contained in the finished varnish composition at a temperature within the range from about 565 to about 620° F. until the mixture starts to gel, adding sufficient material selected from the group consisting of rosins and limed rosins to provide the remainder of the rosin contained in the finished varnish composition, adding the remainder of the soft oil, heating the mixture at a temperature within the range from about 500 to about 620° F. until the mixture has attained the desired viscosity, and thinning with a solvent.

2. The process for preparing a soft oil-limed rosin varnish having an oil length within the range from about 5 to about 100 gallons of oil per 100 pounds of rosin and a combined calcium content within the range from about 1 to about 5% by weight of the total rosin in the varnish which comprises heating from about 25 to about 80% of the total soft oil contained in the finished varnish composition in contact with up to about 25% of the rosin contained in the finished varnish composition at a temperature within the range from about 565 to about 620° F. until the mixture starts to gel, adding sufficient limed rosin to provide the remainder of the rosin contained in the finished varnish composition, adding the remainder of the soft oil, heating the mixture at a temperature within the range from about 500 to about 620° F. until the mixture has attained the desired viscosity, and thinning with a solvent.

3. The process for preparing a soft oil-limed rosin varnish having an oil length within the range from about 5 to about 100 gallons of oil per 100 pounds of rosin and a combined calcium content within the range from about 1 to about 5% by weight of the total rosin in the varnish which comprises heating from about 25 to about 80% of the total soft oil contained in the finished varnish composition in contact with up to about 25% of the rosin contained in the finished varnish composition at a temperature within the range from about 565 to about 620° F. until the mixture starts to gel, adding sufficient limed rosin to provide the remainder of the rosin contained in the finished varnish composition, adding sufficient calcium compound to give a combined calcium content within the range from about 1 to about 5% by weight of the total rosin in the varnish, adding the remainder of the soft oil, heating the mixture at a temperature within the range from about 500 to about 620° F. until the mixture has attained the desired viscosity, and thinning with a solvent.

4. The process for preparing a soft oil-limed rosin varnish having an oil length within the range from about 5 to about 100 gallons of oil per 100 pounds of rosin and a combined calcium content within the range from about 1 to about 5% by weight of the total rosin in the varnish which comprises heating from about 25 to about 80% of the total soft oil contained in the finished varnish composition in contact with up to about 25% of the rosin contained in the finished varnish composition at a temperature within the range from about 565 to about 620° F. until the mixture starts to gel, adding sufficient rosin to provide the remainder of the rosin contained in the finished varnish composition, adding sufficient calcium compound to give a combined calcium content within the range from about 1 to about 5% by weight of the total rosin in the varnish, adding the remainder of the soft oil, heating the mixture at a temperature within the range from about 500 to about 620° F. until the mixture has attained the desired viscosity, and thinning with a solvent.

5. The process for preparing a linseed oil-limed rosin varnish having an oil length within the range from about 5 to about 100 gallons of oil per 100 pounds of rosin and a combined calcium content within the range from about 1 to about 5% by weight of the total rosin in the varnish which comprises heating from about 25 to about 80% of the total linseed oil contained in the finished varnish composition in contact with up to about 25% of the rosin contained in the finished varnish composition at a temperature within the range from about 565 to about 620° F. until the mixture starts to gel, adding sufficient limed rosin to provide the remainder of the rosin contained in the finished varnish composition, adding sufficient calcium compound to give a combined calcium content within the range from about 1 to about 5% by weight of the total rosin in the varnish, adding the remainder of the linseed oil, heating the mixture at a temperature within the range from about 500 to about 620° F. until the mixture has attained the desired viscosity, and thinning with a solvent.

6. The process for preparing a linseed oil-limed rosin varnish having an oil length within the range from about 5 to about 100 gallons of oil per 100 pounds of rosin and a combined calcium content within the range from about 1 to about 5% by weight of the total rosin in the varnish which comprises heating from about 25 to about 80% of the total linseed oil contained in the finished varnish composition in contact with up to about 25% of the rosin contained in the finished varnish composition at a temperature within the range from about 565 to about 620° F. until the mixture starts to gel, adding sufficient rosin to provide the remainder of the rosin contained in the finished varnish composition, adding sufficient calcium compound to give a combined calcium content within the range from about 1 to about 5% by weight of the total rosin in the varnish, adding the remainder of the linseed oil, heating the mixture at a temperature within the range from about 500 to about 620° F. until the mixture has attained the desired viscosity, and thinning with a solvent.

ALBERT T. CAMP.